(12) United States Patent
Horstmanshof et al.

(10) Patent No.: US 7,774,344 B2
(45) Date of Patent: Aug. 10, 2010

(54) DISPLAYING KEY DIFFERENTIATORS BASED ON STANDARD DEVIATIONS WITHIN A DISTANCE METRIC

(75) Inventors: Michael J. Horstmanshof, Shorenline, WA (US); Adam M. Feldstein, Seattle, WA (US); Gordon A. Barnes, Woodinville, WA (US); Peter J. Hanus, Bellevue, WA (US); Paul A. Hagger, Redmond, WA (US); Zachary A. Proffitt, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 11/322,026

(22) Filed: Dec. 29, 2005

(65) Prior Publication Data

US 2007/0156652 A1 Jul. 5, 2007

(51) Int. Cl.
*G06F 7/00* (2006.01)
*G06F 17/30* (2006.01)
(52) U.S. Cl. .................................... 707/736
(58) Field of Classification Search ................ 707/736, 707/999.003
See application file for complete search history.

(56) References Cited

U.S. PATENT DOCUMENTS

| | | | | |
|---|---|---|---|---|
| 5,675,780 A * | 10/1997 | Plant-Mason et al. | ........... | 707/6 |
| 7,295,965 B2 * | 11/2007 | Haigh et al. | ................... | 704/9 |
| 2001/0013035 A1 * | 8/2001 | Cohen | ........................... | 707/5 |
| 2002/0156793 A1 * | 10/2002 | Jaro | ........................... | 707/101 |
| 2003/0033300 A1 * | 2/2003 | Bergman et al. | ................ | 707/5 |
| 2006/0101060 A1 * | 5/2006 | Li et al. | ....................... | 707/102 |

* cited by examiner

*Primary Examiner*—John E Breene
*Assistant Examiner*—Aleksandr Kerzhner
(74) *Attorney, Agent, or Firm*—Shook, Hardy & Bacon LLP

(57) ABSTRACT

Systems and methods are provided to enable viewing and computation of differential data for an item or item subset when compared with other items or subsets. A score may be determined for an item or subset where standard deviations and distance metrics are computed to determine differentiators. In one aspect, a system for comparing data items is provided. The system includes a weighting component to determine a score for an item or subset of items. A differentiator component determines a comparison metric for the item or subset of items based in part on a distance metric to at least one other item or subset of items. A user interface can be provided to display the comparison metrics.

19 Claims, 12 Drawing Sheets

DISPLAYING KEY DIFFERENTIATORS BASED ON STANDARD DEVIATIONS WITHIN A DISTANCE METRIC

BACKGROUND

The Internet has become increasingly popular technology for product purchases (E-commerce) and products researching. Typically, users of the Internet, prior to purchasing a product either online or through a traditional vendor, will research the product using various search tools. Internet users may utilize search tools for a variety of reasons. For example, to research the attributes of a particular product, locations of where to purchase the particular product, or alternative products that have the same attributes as the focal product.

In one example, a user purchasing a car may first research the car on the Internet, where the user may have a particular car in mind and simply desire to determine the best price or the best location of where to purchase the car. However, the user may have a particular car in mind, but desire to view alternative cars having similar attributes as the focal car or having different attributes than the focal car. Researching products, such as a car, having many decision points or criteria, may be a difficult and time-consuming process. In the example of a car, various criteria include, but are not limited to, discrete criteria such as seating capacity, number of doors, average miles per gallon (MPG), manufacturer's specified retail price (MSRP), and curb weight, for example. Further complicating the research and decision process are various criteria that are general in nature such as performance, economy, comfort, and safety.

Current technology lacks the tools to quickly and efficiently enable a purchaser of a product to determine what product best fits the wants and needs of the purchaser. It also would be desirable to have a tool that helps the user determine which criteria are of most importance to them as well as determine the relative importance of each criteria within a respective data set. When deciding between items with many discrete attributes, it becomes necessary to group some into larger aggregate criteria; for example aggregating front leg room, front head room, heated seats, and lumbar support into a "comfort" criteria for cars. Currently there is not an efficient way to call out differences between products or categories. For example, given differences in various vehicle attributes, there are no current methods to determine which are most significant.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Systems and methods are provided to determine and display differences between items or categories based on standard deviations having a distance metric. In one aspect, weightings and scores are aggregated for a plurality of item features such as determining differences for different aspects of a given product for example. From these weightings, distance calculations are performed to determine significant differences or differentiators from a given users perspective. These differences are generally not simple numeric comparisons between features but calculated to highlight significant or key differences between an item under search and other items in an associated class or category. For example, in a car category comparison, a one-inch wheel-base, that is computed and weighted from a difference point of view is not the same computation as computing the difference in cars having a one-inch difference in head room.

In one particular aspect, calculation of a "z-score" for an attribute provides a base for determining differences between items. Key differentiators for items are determined by contrasting each item or group of an items' z-scores for each attribute and highlighting the attributes with a greatest positive (good) and negative (bad) differences. These attributes become presentable as "key differentiators" such as via a graphical user interface for example. In other aspects, algorithmic methods are provided to allow for such comparison and ordering. For example, it can be shown or displayed how a particular car stands out against a single or category of competitors. Thus, differentiators provide a mechanism to determine across multiple attributes (e.g., horsepower, price, fuel economy, and so forth), which are most statistically relevant. Another aspect is that the user can define individual criteria within the aggregate as well as the weightings within the aggregate. Also, the user can weigh the aggregate against all the other criteria in the larger comparison, if desired.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided to enable viewing and computation of differential data for an item or item subset when compared with other items or subsets. A score may be determined for an item or subset where standard deviations and distance metrics are computed to determine differentiators. For example, a product having several product categories may have displayed the most significant difference to some other product or category. In one aspect, a system for comparing data items is provided. The system includes a weighting component to determine a score for an item or subset of items. A differentiator component determines a comparison metric for the item or subset of items based in part on a distance metric to at least one other item or subset of items. A user interface can be provided to display the comparison metrics.

As used in this application, the terms "component," "system," "differentiator," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
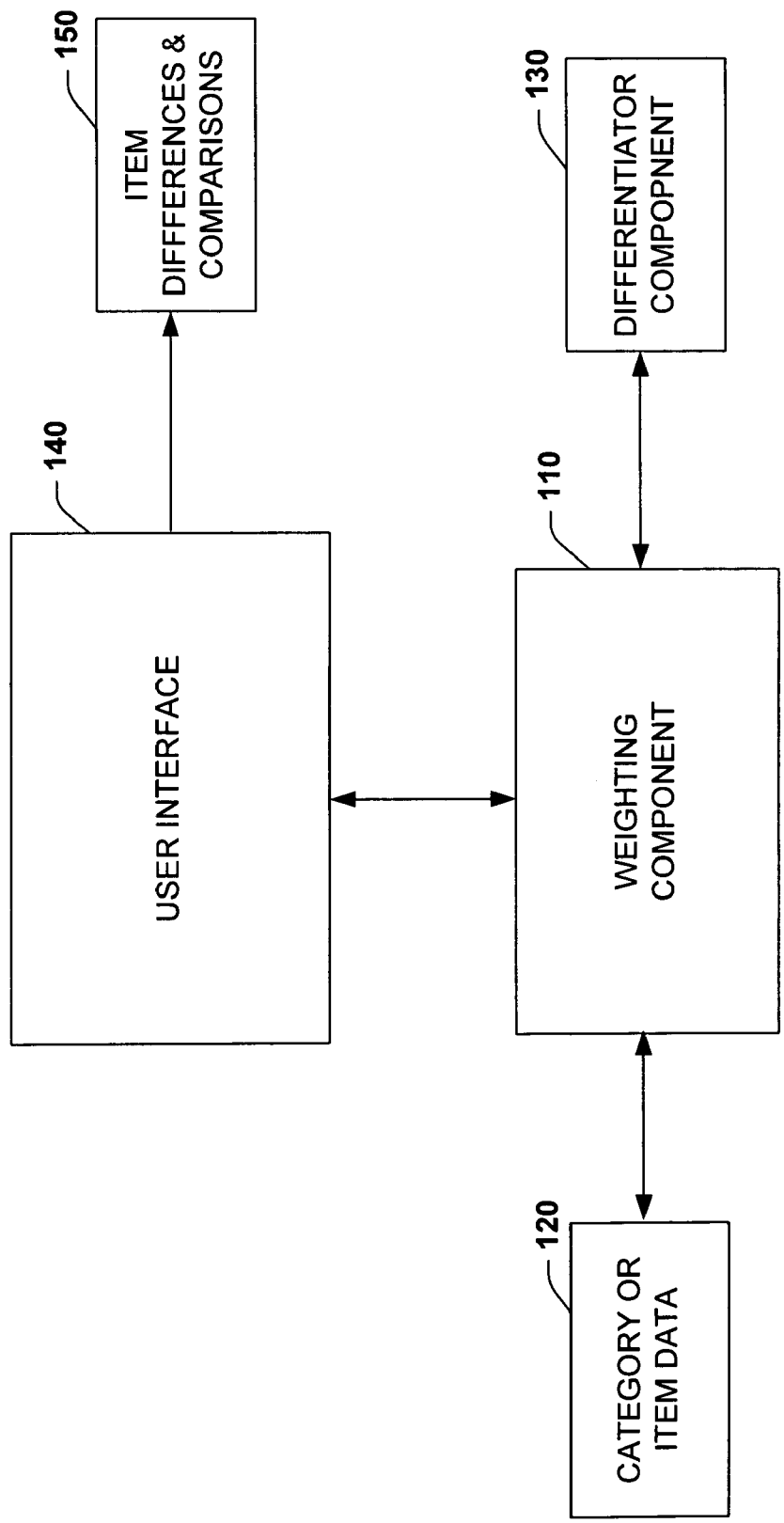
FIG. 1 is a schematic block diagram illustrating a data item comparison system.

Referring initially to FIG. 1, a data item comparison system 100 is illustrated. The system 100 includes a weighting component 110 that determines scores for category or item 120 data 120. Such data 120 can include substantially any type of data such as product data, marketing data, location data, and substantially any type of category or identifier that can be attached or associated with the data. A differentiator component 130 is employed to determine standard deviations on the category or item data 120 and more particularly determine distance metrics between one item or subset of data 120 and at least one item or subset of data. For instance, a product may have three basic features associated with the product. Each feature can be weighted or scored by the weighting component 110 and then distances calculated to other features via the differentiator component 130 to determine a difference between one feature and a group of features or between one product and a subsequent product in this example. After differences are determined for the data 120, a user interface 140 can display item differences and/or comparisons at 150.

In general, the system 100 determines and displays differences between items or categories of data 120 based on standard deviations having a distance metric between such items or categories. In one aspect, weightings and scores are aggregated for a plurality of item features such as determining differences for different aspects of a given product for example. From these weightings, distance calculations are performed to determine significant differences or differentiators from a given users perspective.

In one particular aspect, calculation of a "z-score" for an attribute provides a base for determining differences between items. Score determinations are described in more detail below with respect to FIGS. 9 and 10. Key differentiators for items are determined by contrasting each item or group of an items' z-scores for each attribute and highlighting the attributes with a greatest positive (good) and/or negative (bad) differences at 150. These attributes become presentable as "key differentiators" such as via the graphical user interface 140 for example. In other aspects, algorithmic methods are provided to allow for comparison and ordering. For example, it can be shown or displayed at 150 how a particular car stands out against a single or category of competitors. Thus, differentiators provide a mechanism to determine across multiple attributes (e.g., horsepower, price, fuel economy, and so forth), which are most statistically relevant.

Another aspect is that the user can define individual criteria via the interface 140 within the aggregate as well as the weightings within the aggregate. Also, the user can weigh the aggregate against all the other criteria in the larger comparison via the interface 150, if desired. Other aspects allow data to be gathered and comparisons to be made via supporting JavaScript (or other format) where such data can be placed in a script comparison file which is described in more detail below. Controls for the data and presentation can include a series of elements with unique ID attributes that have their text values updated when an on Change event fires for a display drop down and/or category output (e.g., button). When a selection drop down is changed at the user interface 150, it can dynamically add the correct category data for the respective display 150, select a first category as a default, and then update the respective text areas as comparisons change.

Data for a product or category can originate from a set of files that can be created for each data model during a site build. The files can contain sets of multi-dimensional arrays (e.g., one for each category or trim) that includes the contrasted or differentiator values for the category, base category values, and/or other components of data. Multiple data files can help optimize page load time by reducing the size of the files to be downloaded for respective categories and offloading as much data as possible to files that typically need to be downloaded once.

Figure 2:
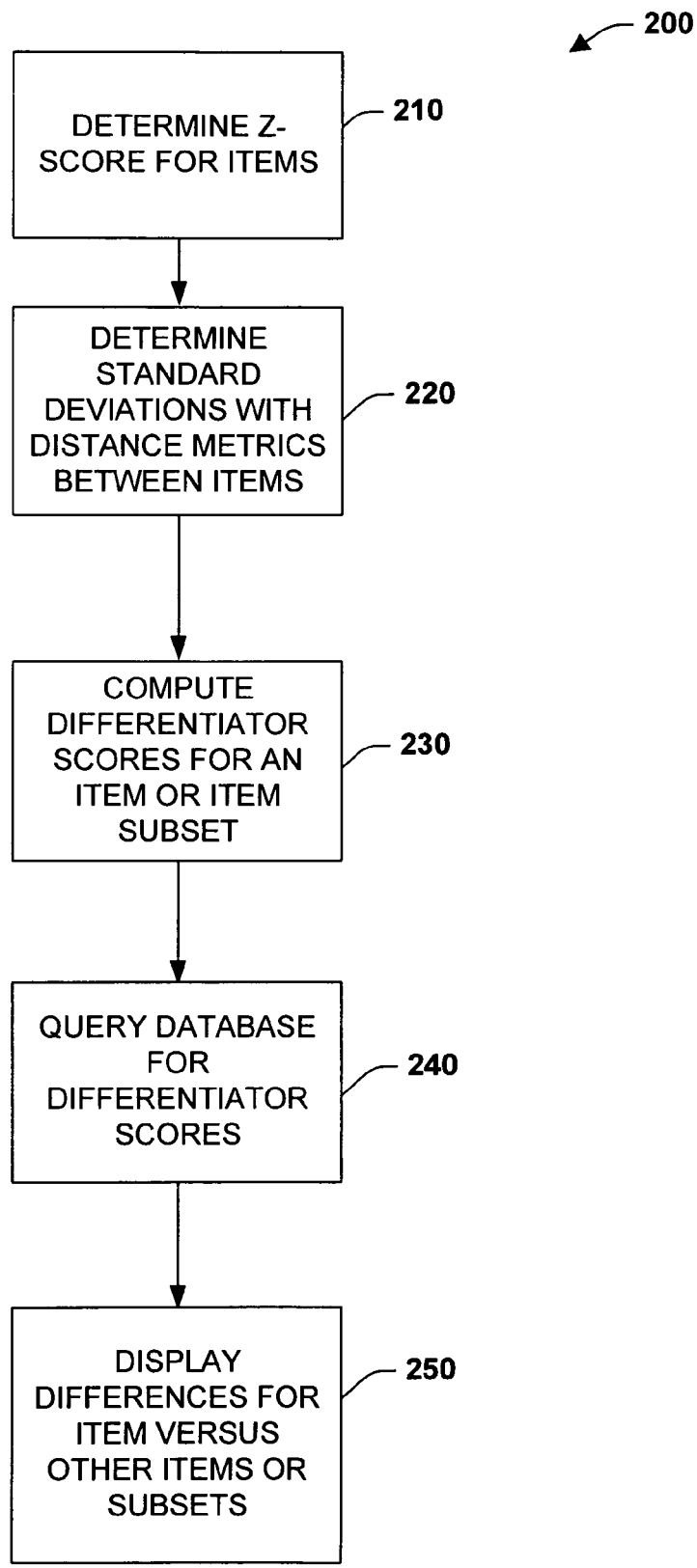
FIG. 2 is a flow diagram that illustrates a data item comparison process.

FIG. 2 illustrates an exemplary process 200 for determining item differentials. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Referring now to FIG. 2, an example process 200 is illustrated where item or category differentials are determined in order to facilitate determining differences between items or categories. 210, a score is determined for one or more data items or item subsets. As will be described in more detail below, such scoring can include determining a "z-score" for the respective items or item subsets. At 220, standard deviations are applied to the z-scores at 210 in order to determine distance metrics between items and/or item subsets. From such distance metrics determined at 220, differentiator scores are determined at 230 that define similarity between an item or a subset or dissimilarity between an item or subset. Such scores can have respective positive or negative values to indicate similarity or dissimilarity. At 240, a database is queried for one or more differentiator scores pertaining to an item, item subset, category, or product. At 250, the queried differentiator data can drive an output display showing key differentiators of differences between an item and another item, between an item and a subset of items, or between item subsets. For example, if car data were compared between a class of cars, differentiator data may highlight that one car has significantly less gas mileage than other members of the class. Such difference could be reflected as a negative designation, for example. As can be appreciated, a plurality of such computations and displays can be provided relating to substantially any type of data or data subset comparison that highlights differences or differentiators between respective class members.

Figure 3:
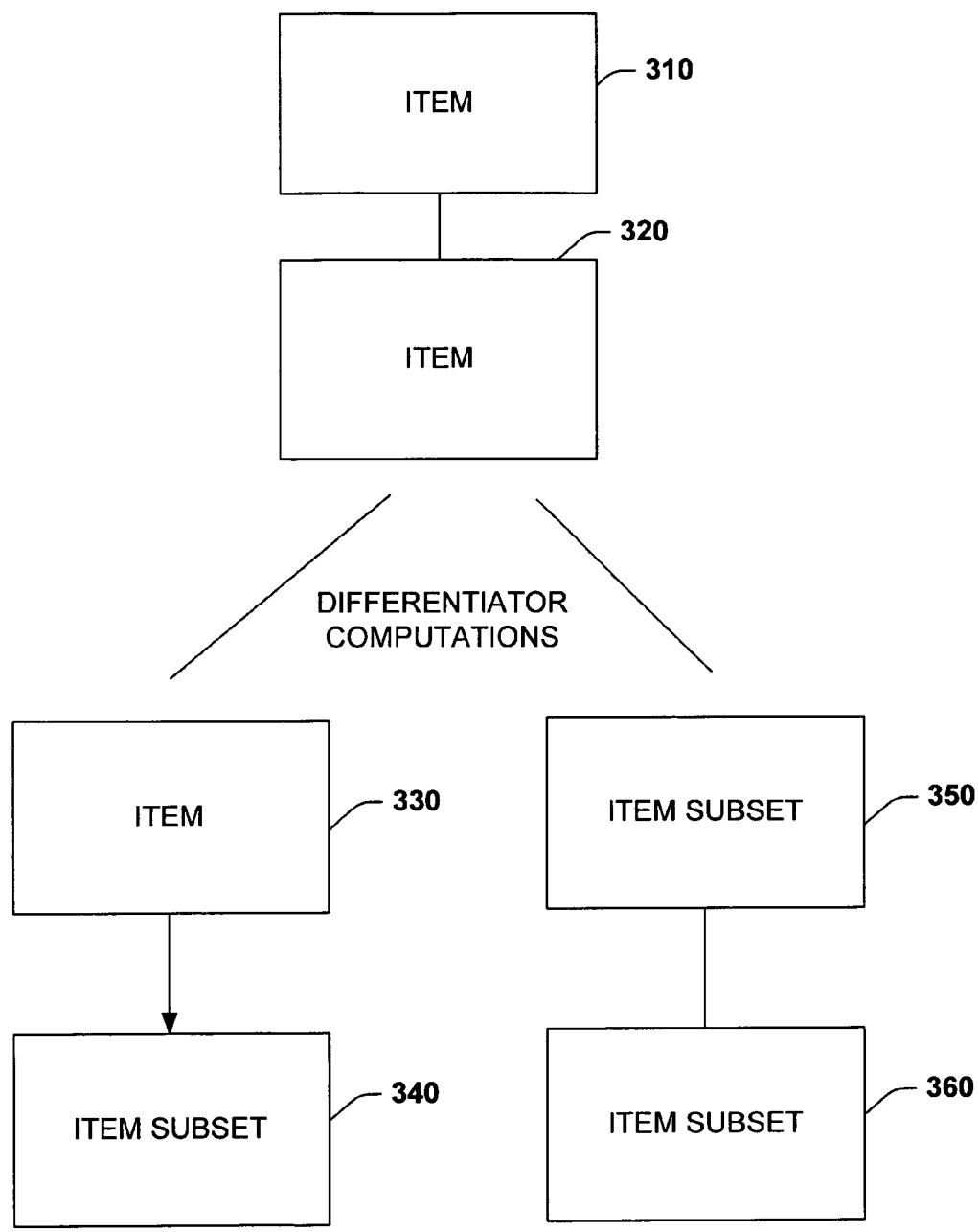
FIG. 3 illustrates example item and/or item subset comparisons.

Referring briefly to FIG. 3, example comparison subsets 300 are illustrated to demonstrate possible types of data groupings that may be possible to score and subsequently determine a respective distance metric for the respective grouping. At 310 and 320, distance metrics can be determined between a data item and another data item. For example, a user may desire to know how one car from a group of cars compares in horsepower without regard to other data items associated with the cars. At 330 and 340, a distance metric is performed between one data item and a subset of data items. For instance, scores may be aggregated for a subset of items yet computed as a distance from the subset to one other item from another set or subset. At 350 and 360, distances can be calculated between subsets of data items, where a respective subset is scored along with at least one other subset, the scores for each subset then aggregated for the respective subsets, then a distance metric calculated between the aggregated scores.

Figure 4:
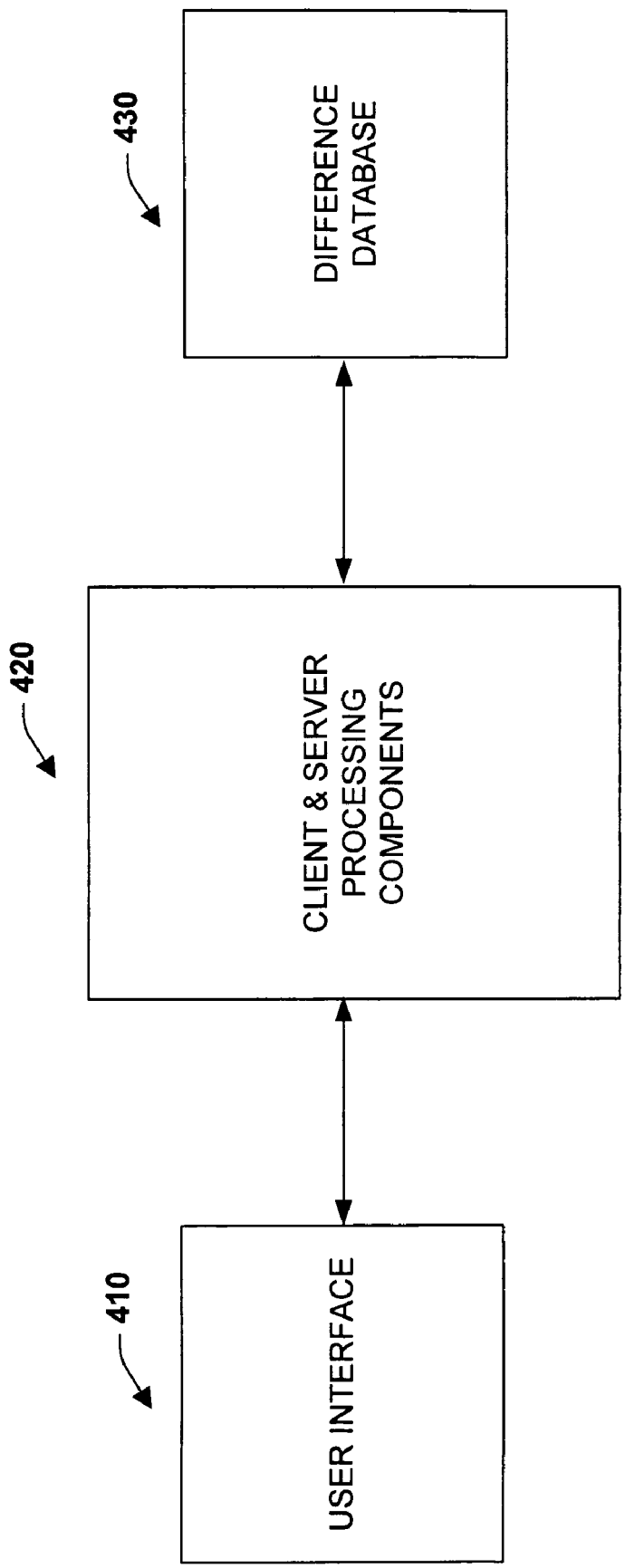
FIG. 4 illustrates an example client/server processing system and user interface.

Turning to FIG. 4, a base system 400 is illustrated for generating and querying differentiator data. The base components of the system 400 include a user interface at 410 for requesting and displaying data, and client and server components 420 for processing and transferring differentiator data from a database 430. In general, to retrieve this data, a request (e.g., XMLHTTPRequest) can be made to an ASPX page for each category or competitor comparison being made on the page. As the data is downloaded, that competitor's comparison "box" can be enabled via the interface 410 and script can be employed make a new request for the next competitor model. Eventually, the data is downloaded to the interface 410 and the page will be active. For example, data for trim-to-trim comparisons can be in a single de-normalized table that is populated by a build process. When an XMLHTTPRequest is made to the ASPX page for data, for example, the page will call a stored procedure that returns a result set containing the comparisons for the two models (e.g., focal and competitor). This can be packaged into delimited text string and returned to the client 420 for parsing and display at the interface 410.

Splitting out the base comparison data into a separate file provides a base level of functionality if the XMLHTTPRequest cannot be processed and provides a rollback path. Another aspect includes populating the data set into static script files and having the files downloaded fully to the client 420, which may affect performance, but allow the page to continue to function.

It is noted that the user interface 410 can include a display having one or more display objects (not shown) for manipulating data items including such aspects as configurable icons, buttons, sliders, input boxes, selection options, menus, tabs and so forth having multiple configurable dimensions, shapes, colors, text, data and sounds to facilitate operations with the user model and search components. In addition, the interface can also include a plurality of other inputs or controls for adjusting and configuring one or more data aspects. This can include receiving user commands from a mouse, keyboard, speech input, web site, remote web service and/or other device such as a camera or video input to affect or modify operations of the interface 410.

Figure 5:
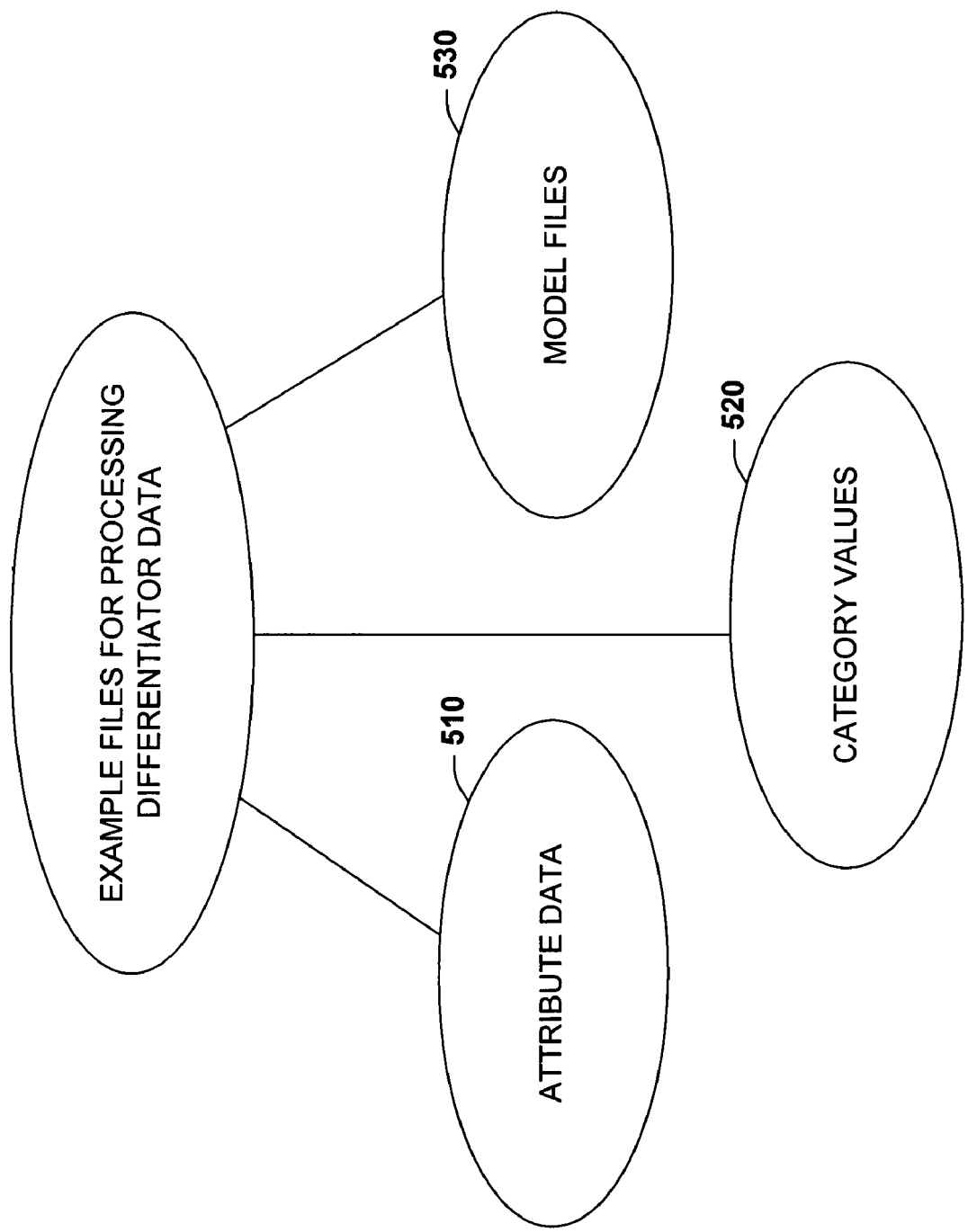
FIG. 5 illustrates example data files for item processing and comparison.

FIG. 5 illustrates example data files 500 for processing differentiator data. Before proceeding, it is noted that data examples provided in this section pertain to cars but as noted above, substantially any type of data can be processed. At 510, an attribute script file can be provided. This file can include lookup/domain data for Decision Guide attributes with the attribute names. This data can remain relatively static and can be shared around the site to other systems. A possible example of the data that would be in this file is:

att[0]='MSRP';
att[1]='Total Cost of Ownership';
att[2]='Model Warranty Basic';
etc.

At 520, category values are provided. This file can include a list of category names and IDs as well as the attribute values/averages for each attribute in each category. This file is generally downloaded once, as this data will not change from model to model and can be reused on other pages around the site. An example of what this file may appear as:

cat[0]='Small Cars';
cat[1]='Mid-sized Cars';
cat[2]='Large Cars';
etc.
catVals[0][0]='12,000';
catVals[0][1]='170';
catVals[0][2]='3';
etc.

Where the first index position in the catVals array is the category ID and the second is the attribute ID.

At 530, a model file can be generated. In this case, a JavaScript file can be generated for each model ID, named appropriately with the model ID (1001.js, for example), and placed in a folder on web servers. The contents of this file can be three arrays, indexed on trim id, containing the values for each category and for each attribute used to fill in "Basic" and "Standout" sections of a product or category. In addition, there can be a much smaller array defining the categories each trim is a member that will be used to dynamically render the category. Since this can be a little confusing, here is an example of a section of the model file with the different fields defined.

Figure 6:
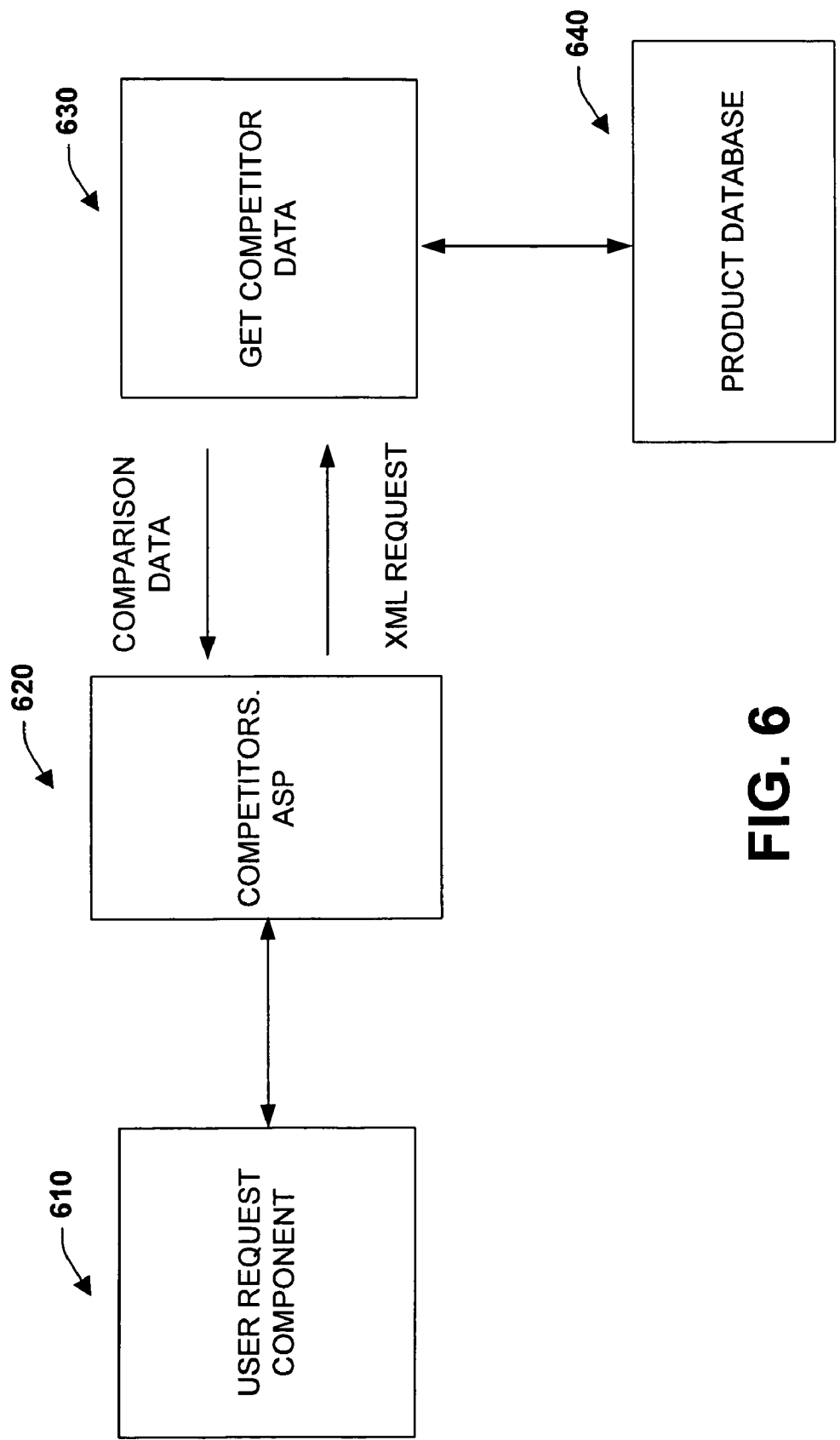
FIG. 6 illustrates an example system for requesting and retrieving item comparison data.

FIG. 6 illustrates a more detailed client and server model 600 for accessing and generating differentiator data. As illustrated, a user request component 610 generates a competitor's page at 620 that is submitted as an XML request to a server component 630 that queries data from a database 640. When the data is retrieved, the server component 630 competitors page 620 to satisfy the user request component 610. The following describes one particular example implementation for the client and server model 600, however it is to be appreciated that other implementations are possible.

Client side code can be a standard AJAX interface for processing JavaScript codes and that utilizes XMLHTTPRequest to make a request to the server in client side (JavaScript) code. Initially, the page 620 can be rendered using the base comparison data downloaded in a static, built file. When the page has downloaded, an XMLHTTPRequest can be made to the server at 630 for each focal model to competitor model comparison. As each request completes, that comparison's drop down will be enabled. Multiple requests can be made as XMLHTTPRequest may not allow access to the response stream until the response is completed. If, instead, a single request with a single response containing all the data for the comparison page was used it can result in the user waiting to use the page until the entire data set had been downloaded and parsed, which may not be desirable.

JavaScript (JS) for the XMLHTTPRequest usage and other global/library functions can be placed in a single JS file for use on other pages. One aspect is to create a library of functions that can be reused for other AJAX implementations if desired. The response returned by the server 630 can be a delimited text stream rather than XML to save on size. The text stream can be parsed on the client and converted into arrays. Changing the focal trim or competitor trim drop downs displays can fire an on Change event that changes the display. All data not in the response stream can be written to the page as JavaScript during the initial render (trim names, model names, and so forth) or pulled from an attributes script file (attribute names, and so forth) or other included JS files.

The response stream from the server at 630 should be a compact string that can be quickly parsed and split into a data set on the client. Each response stream should encompass the data for a focal model to competitor model comparison, which implies it will have comparisons between at least two data sets. The server side page that the XMLHTTPRequest will be posted to is responsible for making the call to the database 640 and assembling the response stream. The page will take at least two parameters (e.g., focal model ID and competitor model ID) and can use a stored procedure to fetch the data. The page can write the result of the query (a formed response string) out to the response stream where it can then be received by the client.

When a page first loads, a request queue can be created can be a list of competitor model IDs, for example. The code that executes the XMLHTTPRequest iterates over the list, making each request and parsing the response stream in turn. If the request was successful, that item can be popped off the queue but if it fails, it can remain in the queue. The code can loop back over the queue and attempt each failed request again if desired, again popping any successful requests off the queue. This can continue until either the queue is empty or a predetermined number of passes are made. If a request cannot be completed, an error message can be written to that model's area of the screen indicating that all data for the competitor could not be downloaded and the complete data is not available.

FIGS. 7-10 are provided to show some example data structures and z-score computations from which the differentiators described above can be computed. For ease of understanding, and not by way of limitation, various aspects will be explained in the context of a vehicle purchase but substantially any item or category comparison can be achieved. Further, exemplary methods described in further detail in relation to FIGS. 10-11 utilize attributes pertaining to cars, which have a particular taxonomy. The taxonomy of cars is year, make, model, and trim. For example, but not by way of limitation, a 2005 Honda Accord EX V6 has a year of 2005, a make of Honda, a model of Accord, and a trim of EX V6. Generally, there are a number of trims for each model. In a normal model year, there are approximately 300 models and approximately 1,700 trims. Attributes associated with each trim are used to determine the relevant results to return to the user, but, however, it is not uncommon for a particular trim to be missing attributes. In one instance, fuel economy data may be missing for about 20% of the trims. These may be termed data holes. One aspect for filling these data holes is as follows: use an average of the other trims for the specific model year, use an average for the vehicle family for the latest model year data that is available, or use an average for the category for the model year to which the trim belongs.

Since a particular model may comprise a number of trim sets, various aspects may utilize a "wide-vector" analysis to expeditiously process a purchaser's search of comparison cars (or products). Wide-vector analysis comprises consolidating high and low values for each attribute for each trim set associated with a model. By way of example, but not by way of limitation, if a particular model includes 3 trims having MPG ratings of 19 City 25 Hwy, 19 City 27 Hwy, and 17 City 22 Hwy, then the wide-vector may be min 17 max 27 MPG. If a purchaser's criteria indicates a preference for a vehicle having a 30 MPG rating, the particular model would not be utilized in returning relevant results to the purchaser.

Figure 7:
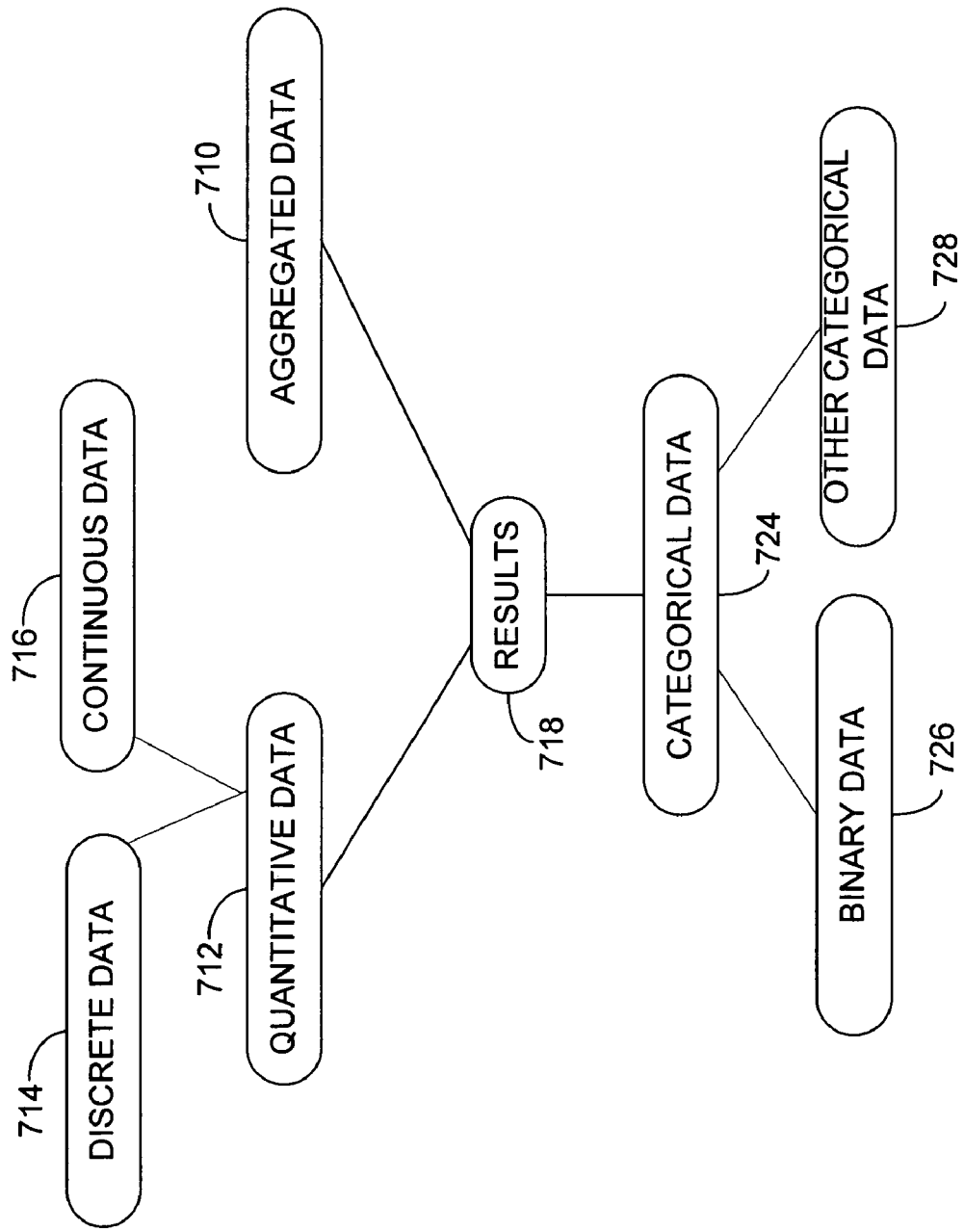
FIG. 7 illustrates exemplary attributes used in determining the relevancy of a comparison product to a focal product.

Referring now to FIG. 7, there is illustrated exemplary attributes used in determining the relevancy of a comparison product to a focal product. As mentioned above, throughout this disclosure, for ease of understanding, the various attributes and algorithms are described in relation to purchasing a car but can be applied to other categories or data items. Attributes 700 of FIG. 7 may comprise, but are not limited to, quantitative attributes 712 which includes discrete attributes 714, and continuous attributes 716. Attributes 700 further include, but are not limited to, aggregated attributes 710, and categorical attributes 724. Categorical attributes 724 further include binary attributes 726, and other categorical attributes 728. Discrete attributes 714 comprise attributes such as seating capacity and number of doors on a car. Continuous attributes 716 comprise attributes such as MPG, MSRP, and curb weight. Further, binary attributes 726 may be expressed as "True" or "False". Other categorical attributes 728 may include bit masked attributes (attributes belonging to one or more categories), and attributes belonging to a single category. Aggregate attributes 710 are general in nature, such as, but not limited to, performance, fuel economy, comfort, and safety. Aggregate attributes 710 comprise an amalgamation of one or more attributes that are either categorical or quantitative in nature. The aforementioned attributes are used to present results 718 to a user Turning now to FIG. 8, a method 800 is illustrated comparing a focal vehicle to a comparison vehicle. The method 800 comprises a preparation at 820. This prepares, for purposes of comparison, attributes related to various trim models of comparison products or vehicles. This will be further described in relation to FIG. 9. At 822, methods are provided related to calculation of comparison values using attributes prepared at 820. Finally, at 824, comparison results are rendered based on calculations performed at 820 and 822.

Figure 9:
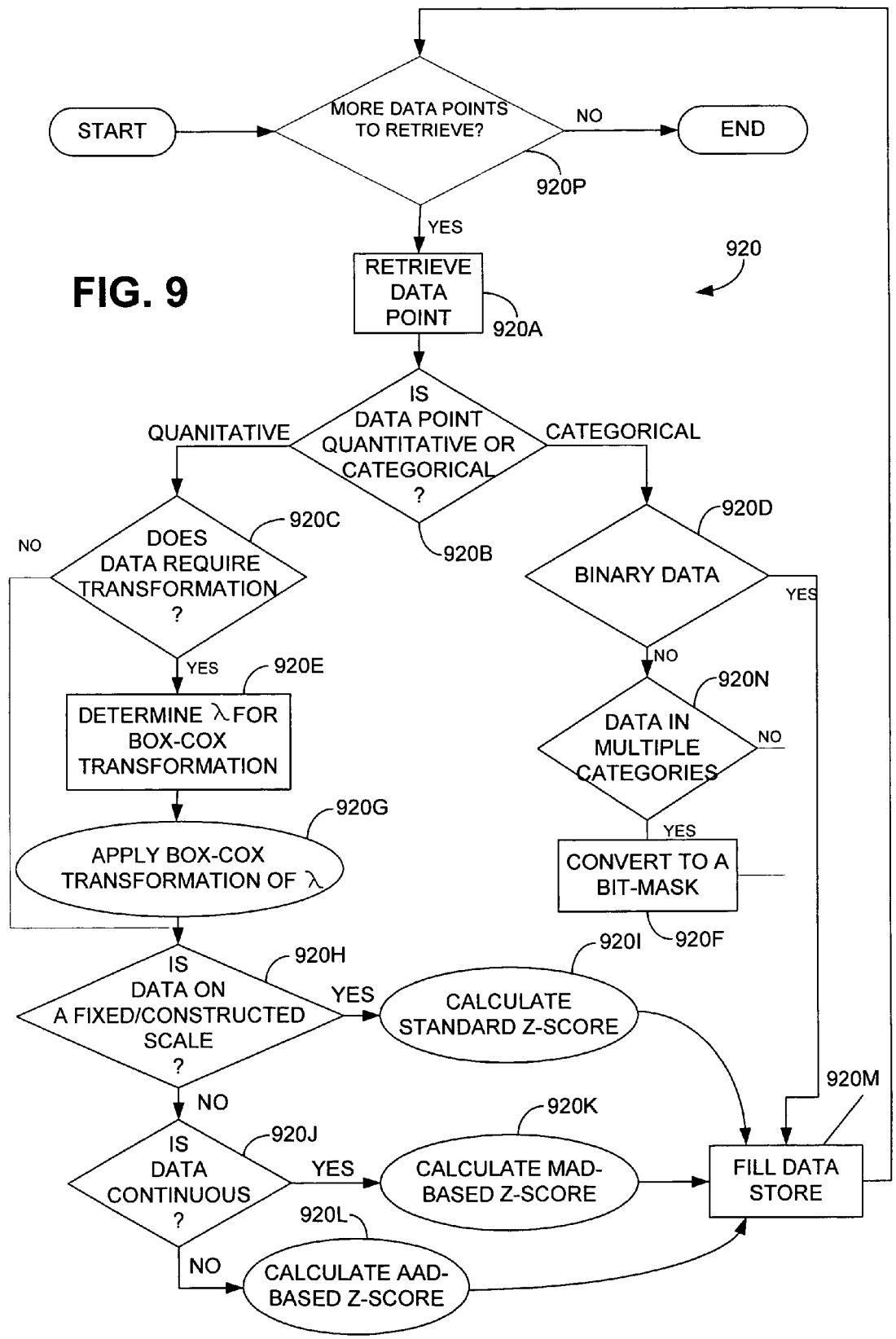
FIG. 9 illustrates a process for standardizing attributes.

Turning now to FIG. 9, a process 920 is illustrated. At 920A, trim set attributes relating to a variety of vehicles—which in later analysis may be used either as focal or comparison vehicles—are retrieved from a data store or data stores. At 920B, a determination is made as to whether a particular attribute of a trim set is categorical or quantitative in nature. Quantitative attributes may be, but are not limited to, discrete or continuous attributes. Categorical attributes, include, but are not limited to, binary attributes, and other categorical attributes. Continuing with 920B, if a particular attribute of a trim set is quantitative in nature, a decision is made at a 920C as to whether the attribute requires transformation.

In order to standardize or normalize the various trim set attributes in preparation method 920, an assumption is made that the attributes being standardized approximates a normal distribution (e.g., assumes the shape of a bell curve). Some aspects assume attributes in a trim set are in a normal distribution, a positively skewed distribution, or a negatively skewed distribution. In a normal distribution, a one unit difference has the same significance at any part of the distribution, in a positively skewed distribution, a one unit difference gains in significance the further to the lower end of the distribution, and in a negatively skewed distribution, a difference of one unit gains in significance the further to the higher end of the distribution. Continuing with 920C, if the attributes comprising a particular trim set are not in a normal distribution, then a Box-Cox transformation is utilized to approximate the attributes in the particular trim set as a normal distribution. In other words, the Box-Cox transformation normalizes the data. The Box-Cox transformation is shown below in equation (1), with exemplary values of lambda given in Table 1.

$$T(x_i) = \frac{x_i - 1}{\lambda} \quad (1)$$

TABLE 1

| $\lambda$ (lambda) | Transformation |
|---|---|
| 1.0 | No transformation |
| 0.5 | Square root transformation |
| 0 | Log transformation |
| -1 | Reciprocal Transformation |

In equation (1), $x_i$ is the data point and $\lambda$ is the transformation parameter. A log-likelihood equation is used to determine the value of $\lambda$ that provides values of the transformation of equation (1) which will normalize the particular attributes in the trim set. The optimal $\lambda$ value is determined at 920E as shown in Table 1. At 920G, the Box-Cox transformation is applied using the value of $\lambda$ determined at 920E.

If no transformation is required at 920C, or a transformation is applied at 920G, the attributes are standardized at 920I, 920K, and 920L. Standardization may be useful for understanding the extent to which the difference in each attribute contributes to an overall comparison score between the focal vehicle and a comparison vehicle. A Z-score is utilized to standardize attributes relating to a trim set. At 920H, if the data is on a fixed/constructed scale, then a standard Z-score is calculated for the data at 920I. A standard Z-score is utilized because fixed/constructed data (e.g., reliability rating) generally does not comprise "outliers." Outliers are data points that skew the values of the mean and standard deviation. A standard Z-score is illustrated below in Equation (2).

$$z_{xi} = \frac{x_i - \bar{x}}{s} \quad (2)$$

Where $x_i$ is the data point being standardized, $\bar{x}$ is the arithmetic mean, and $s$ is the standard deviation.

At 920J, if the attribute is continuous (e.g., curb weight), a median absolute deviation about the median (MAD) is utilized to account for the effect of outliers. The MAD-based Z-score is illustrated below in equation 3. Where $\tilde{x}$ is the median.

$$z''_{xi} = \frac{x_i - \tilde{x}}{MAD}, \text{ where } MAD = \text{median}(|x_i - \tilde{x}|) \times 1.4826 \quad (3)$$

If at 920J the data is not continuous, but is discreet data (e.g., seating capacity) the standard deviation, s, of equation (2) can be replaced with the average absolute deviation about the mean (AAD) as shown below in equation (4).

$$z'_{xi} = \frac{x_i - \bar{x}}{AAD}, \text{ where } AAD = \frac{\sum_{i=1}^{n}|x_i - \bar{x}|}{n} \quad (4)$$

After standardizing the data points at 920I, 920K, and 920L, a data store is created at 920M that comprises the standardized or normalized attributes for each particular trim set. Referring back to 920B of method 920, if the data points of a particular set of trim data are categorical in nature, then method 920 continues at a 920D. At 920D, if the particular data is not binary, and belongs to multiple categories, then each attribute is converted to a bit mask having a category ID represented by a bit in the bit mask. The converted categorical attributes, along with binary, and exclusive categorical data is stored in the created data store at 920M. Thus, method 920 results in the creation of a data store 920M having standardized or normalized trim set attributes. The vehicle attributes may then be used to compare a focal vehicle to a comparison vehicle. At 920 if no data points are to be retrieved, method 920 ends.

Figure 10:
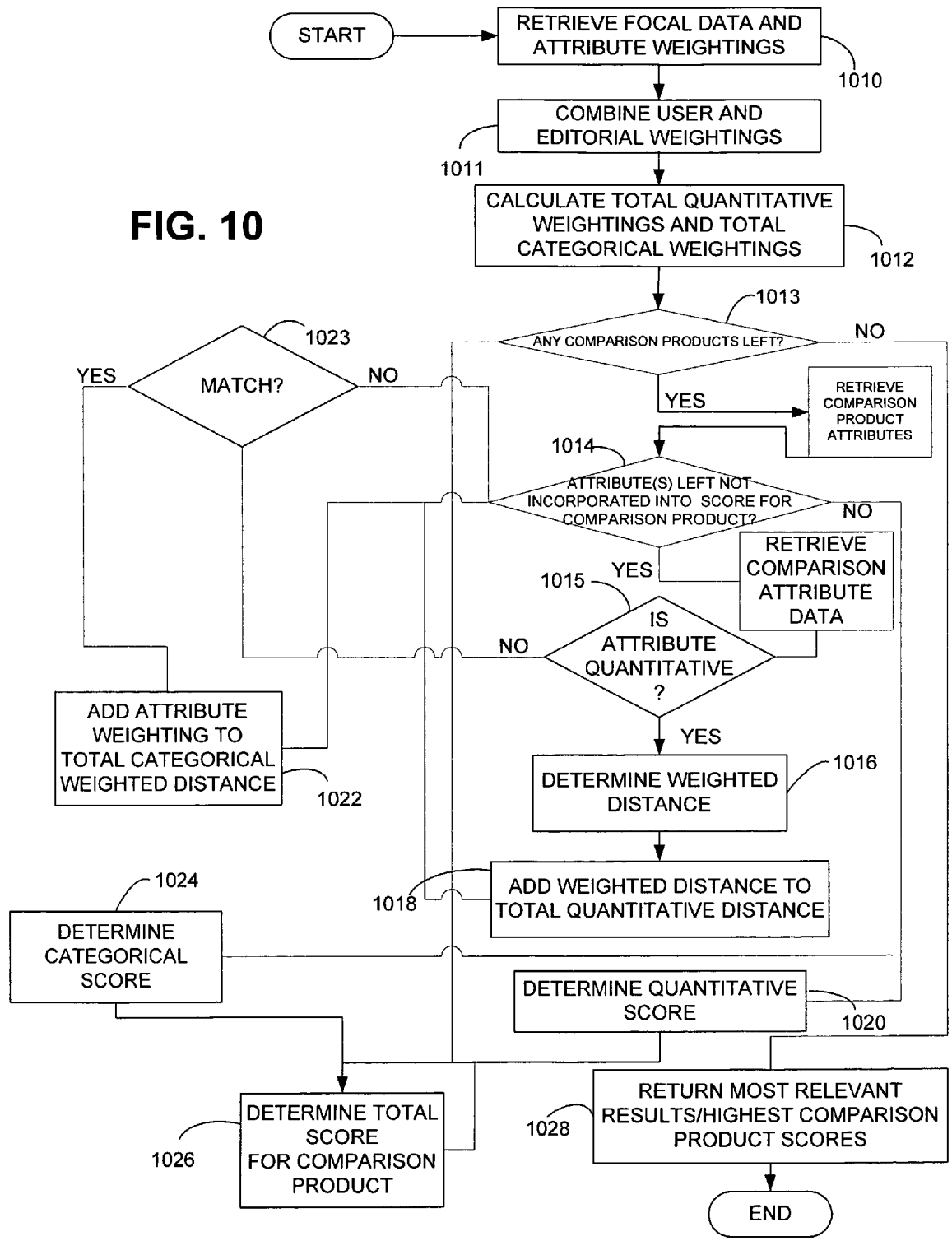
FIG. 10 illustrates a method for returning results in a search for comparison vehicles having attributes that are substantially similar to a focal vehicle.

Referring now to FIG. 10, there is illustrated a method 1000 for returning relevant results in a search for comparison vehicles that are substantially similar to a focal vehicle when compared on an attribute-by-attribute basis. Method 1000 compares the focal vehicle to a set of comparison vehicle attributes and returns a score representing how substantially similar a particular comparison vehicle in the set of comparison vehicles is to the focal vehicle. The vehicles are compared on an attribute-by-attribute basis. Scores may, but are not limited to the range of 0 to 1, with 1 representing an exact match and 0 representing the greatest possible mismatch. At 1010, the focal car attributes are retrieved and attribute weighting are retrieved. attribute weightings may be given by the user, or may be default weightings. Attribute weightings given by the user may be using several attributes ranging from safety to base MSRP price in a field.

At 1011, user and editorial weightings are combined. At 1012, total quantitative and categorical weightings are calculated. At 1013, comparison vehicle attributes are retrieved in an iterative/per vehicle basis. At 1014, each individual attribute of the current comparison vehicle is iteratively retrieved for contrasting with the same attribute of the focal vehicle. At 1015, a determination is made as to whether an attribute in a trim set is quantitative. If the attribute is quantitative, at 1016, a weighted distance is calculated. Weighted distances may be calculated using one of the two example metrics given below in equations (5) and (6).

$$d_{xy} = \sum_{i=1}^{n} w_i |x_i - y_i| \quad (5)$$

$$d_{xy} = \sqrt{\sum_{i=1}^{n}(w_i(x_i - y_i))^2} \quad (6)$$

In equations (5) and (6), $w_i$ is the weight assigned to the $i^{th}$ attribute, $x_i$ is the value of the $i^{th}$ attribute of the focal vehicle, and $y_i$ is the value of the $i^{th}$ attribute of the comparison vehicle. $W_i$ may represent any combination of weights assigned by the user or editorially assigned. Equation (5) treats the distance between two vehicles as if moving along each dimension in a N-dimensional universe to move from one vehicle to the next. Equation (6) treats the distance between two vehicles as if it were a straight line. At 1018, the weighted distances computed at 1016 are added to the total quantitative weighted distances.

At 1023, a determination is made as to whether there is a match between the focal vehicle and the associated attribute of the comparison vehicle. If yes, at 1022, the attribute weighting is added to the total categorical weighted distance. After completing the iterations of 1014, at 1024 and 1020, the quantitative and categorical scores are determined by, respectively, equations (7) and (8) below.

$$sim_{xy} = 1 - \frac{d_{xy}}{\max|d|} \quad (7)$$

$$sim_{xy} = \frac{\sum_{i=1}^{n} w_i sum_i}{\sum_{i=1}^{n} w_i} \quad (8)$$

In equation (7), $\max|d|$ is computed by calculating the distance between two concept vehicles: one having the largest values for each quantitative attribute in the trim set, and the other having the smallest values for each quantitative attribute in the trim set. The same weighting used in calculating $d_{xy}$ should be utilized when calculating $\max|d|$. This produces a similarity score in the range of 0 to 1. In equation (8), $sum_i$ equals 1 if there is a match on the $i^{th}$ attribute or 0 if there is not a match. $W_i$ is the editorial or user weightings. At a 1026, a score for both quantitative and categorical attributes for a given comparison vehicle is determined using equation (9) below.

$$sim_{xy} = \frac{\left(sim_{c(xy)} \times \sum_{i=1}^{n_c} w_{ci}\right) + \left(sim_{q(xy)} \times \sum_{j=1}^{n_q} w_{qj}\right)}{\sum_{i=1}^{n_c} w_{ci} + \sum_{j=1}^{n_q} w_{qj}} \quad (9)$$

In equation (9), $n_c$ is the total number of categorical attributes, and $n_q$ is the number of quantitative attributes. After completing the iterations for 1013, at 1028, the most relevant results in the set of comparison vehicles are returned to the user.

Figure 11:
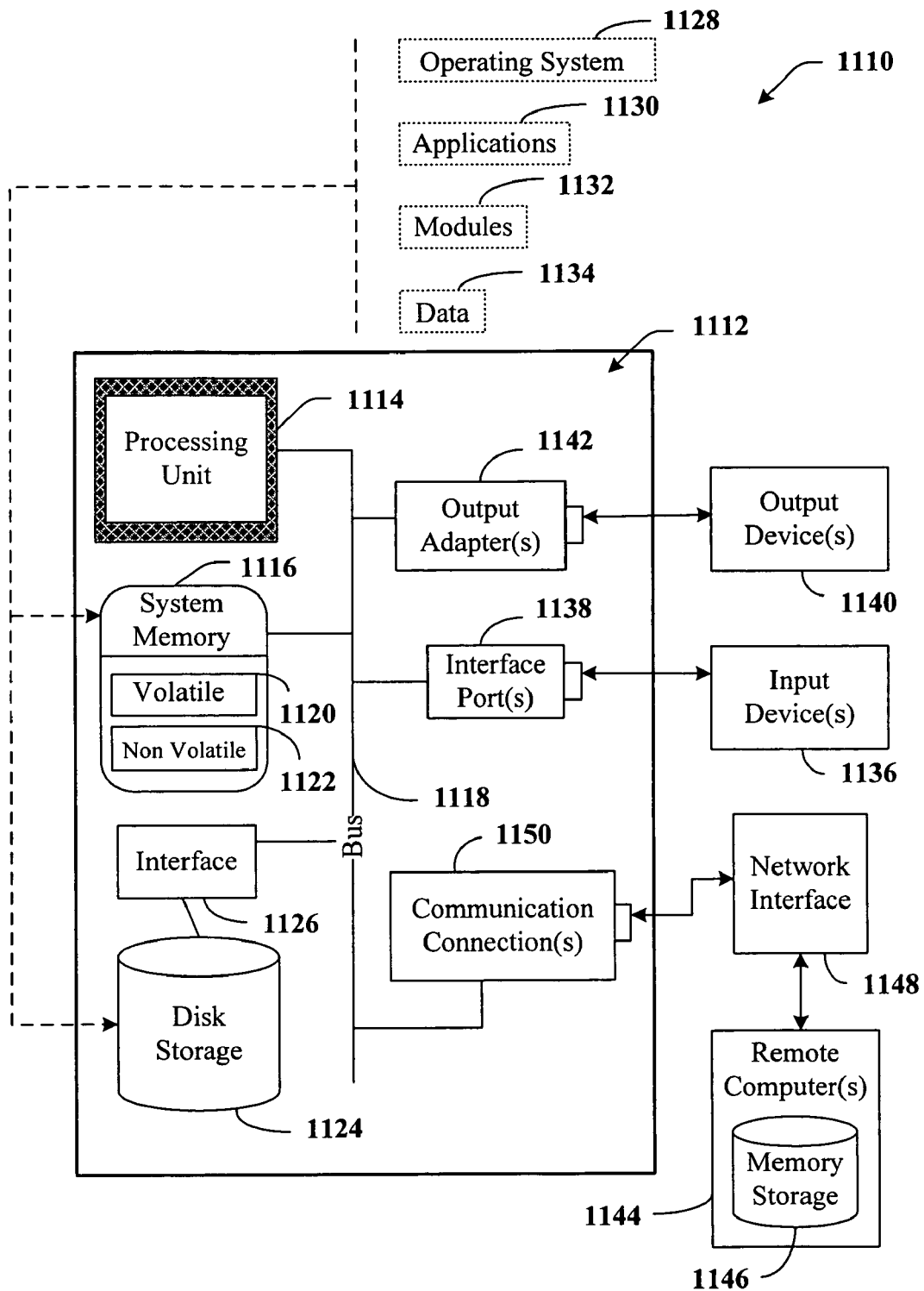
FIG. 11 is a schematic block diagram illustrating a suitable operating environment.
Figure 12:
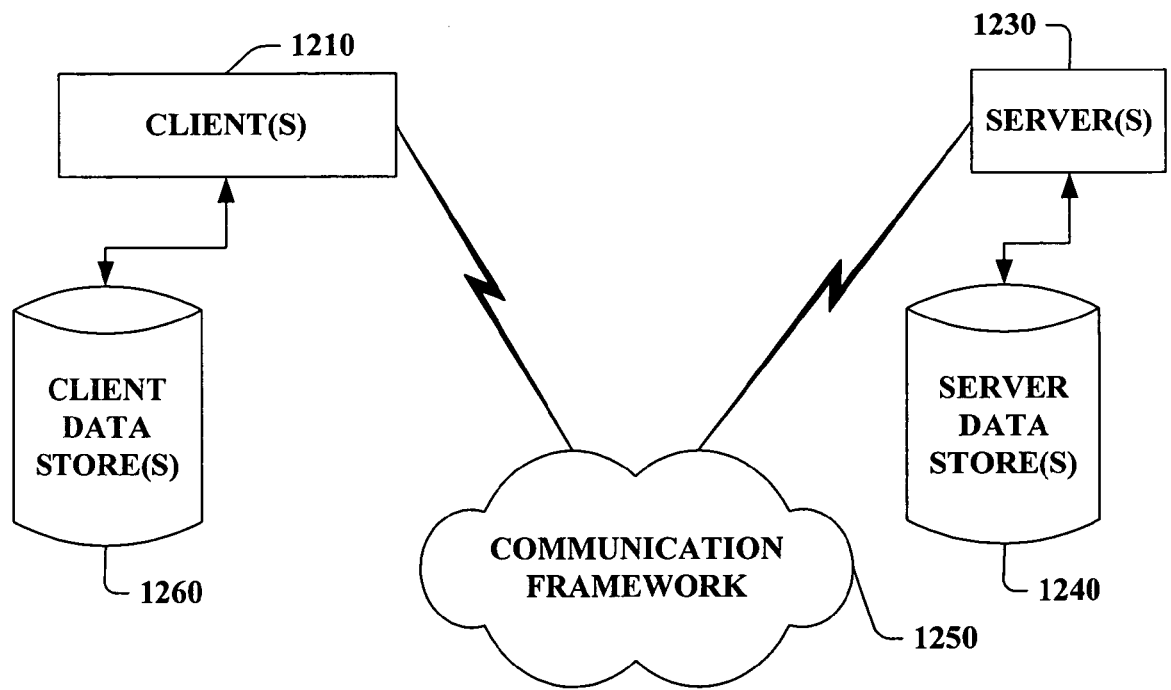
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, main-frame computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1110 for implementing various aspects described herein includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that various components described herein can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 that can be employed. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or or software (e.g., threads, processes, computing devices). The servers 1230 can house threads to perform transformations by employing the components described herein, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer storage medium having stored thereon computer executable instructions that when executed on one or more processors compares data items, comprising:
    a weighting component to determine a score for a focal item or subset of items having a plurality of attributes;
    a differentiator component to determine a comparison metric for the focal item or subset of items based in part on a distance metric to at least one other item or subset of items having a plurality of attributes, wherein the distance metric ($sim_{xy}$) for each of the at least one other item or subset of items is based upon a total quantitative weighted distance and a total categorical weighted distance, and is determined by multiplying the total quantitative weighted distance by the sum of weights of the quantitative attributes and adding the multiplication of the total categorical weighted distance by the sum of weights of the categorical attributes and dividing the previous addition by the sum of the weights of the quantitative and categorical attributes as represented by the following:

$$sim_{xy} = \frac{\left(sim_{c(xy)} \times \sum_{i=1}^{n_c} w_{ci}\right) + \left(sim_{q(xy)} \times \sum_{i=1}^{n_q} w_{qj}\right)}{\sum_{i=1}^{n_c} w_{ci} + \sum_{i=1}^{n_c} w_{qj}},$$

$$sim_{q(xy)} = 1 - \frac{d_{xy}}{\max|d|}, \quad sim_{c(xy)} = \frac{\sum_{i=1}^{n_c} w_{ci} sum_i}{\sum_{i}^{n_c} w_{ci}},$$

where $sim_{q(xy)}$ is a quantitative score for quantitative attributes of the items x and y, each quantitative attribute is at least one of discrete or continuous, $d_{xy}$ is a distance measurement for the quantitative attributes of the items x and y, and max |d| is a distance between two concept items:

one having the largest values for each quantitative attribute of the set of items, and the other having the smallest values for each quantitative attribute of the set of items, $d_{xy}$, and max $|d|$ have the same weighting for the same attribute, where $sim_{c(xy)}$ is a categorical score for categorical attributes of the items x and y $sum_i$ equals 1 if there is a match on the $i^{th}$ categorical attribute of items x and y or 0 or there is not a match on the $i^{th}$ categorical attribute of items x and y, each categorical attribute is at least one of binary or bitmask, $w_{ci}$ is the weighting of the $i^{th}$ categorical attribute $n_c$ is the number of categorical attributes and i is an integer, where $w_{qi}$ is the weighting of the $i^{th}$ quantitative attribute, $n_q$ is the number of quantitative attributes and i is an integer; and a normalization component configured to standardize the attributes using a standard deviation that evaluates a z-score for the attributes, the normalization component also generates differentiators for attributes that are determined by contrasting each attribute's z-score and highlighting the attributes with a greatest positive or negative difference for display.

2. The computer storage medium of claim 1, further comprising a user interface to display the comparison metrics.

3. The computer storage medium of claim 1, further comprising an interface component for a user to define weightings to each attribute.

4. The computer storage medium of claim 3, further comprising at least one script file for comparison of one or more data items.

5. The computer storage medium of claim 4, further comprising one or more controls for data presentation that includes a series of elements with unique ID attributes that have text values updated when a change event fires.

6. The computer storage medium of claim 5, further comprising a component that dynamically adds category data for a display.

7. The computer storage medium of claim 1, further comprising a computer storage medium for executing the differentiator component or the weighting component.

8. A computerized method for data comparison, comprising:

standardizing, by a processor, attributes for each product using a standard deviation that evaluates a z-score for the attributes;

determining, by the processor, a statistical distance $sim_{xy}$ between a product x and each product y of a set of products, each product having a plurality of attributes, wherein the statistical distance is determined by the following equations:

$$sim_{q(xy)} = 1 - \frac{d_{xy}}{\max|d|}$$

where $sim_{q(xy)}$ is a quantitative score for quantitative attributes of the products x and y, $d_{xy}$ is a distance measurement for the quantitative attributes of the products x and y, and max $|d|$ is a distance between two concept products: one having the largest values for each quantitative attribute of the set of products, and the other having the smallest values for each quantitative attribute of the set of products, $d_{xy}$, and max $|d|$ have the same weighting for the same attribute;

$$sim_{c(xy)} = \frac{\sum_{i=1}^{n_c} w_{ci} sum_i}{\sum_{i}^{n_c} w_{ci}}$$

where $sim_{c(xy)}$ is a categorical score for categorical attributes of the products x and y, $sum_i$ equals 1 if there is a match on the $i^{th}$ categorical attribute of products x and y or 0 or there is not a match on the $i^{th}$ categorical attribute of products x and y, $w_{ci}$ is the weighting of the $i^{th}$ categorical attribute $n_c$ is the number of categorical attributes and i is an integer;

$$sim_{xy} = \frac{\left(sim_{c(xy)} \times \sum_{i=1}^{n_c} w_{ci}\right) + \left(sim_{q(xy)} \times \sum_{i=1}^{n_q} w_{qj}\right)}{\left(\sum_{i=1}^{n_c} w_{ci} + \sum_{i=1}^{n_c} w_{qj}\right)}$$

where $w_{qj}$ is the weighting of the $j^{th}$ quantitative attribute, $n_q$ is the number of quantitative attributes and j is an integer; and returning statistical differences of the products based in part on the statistical distance $sim_{xy}$ and differentiators that are identified by contrasting each attribute's z-score and highlighting the attributes with a greatest positive or negative difference for display.

9. The method of claim 8, further comprising employing at least one of an attribute file, a values file, and a model file to communicate the statistical differences.

10. The method of claim 8, further comprising dynamically updating a display based upon a detected change in the statistical differences.

11. The method of claim 8, further comprising generating a product competitors page that contrasts products based upon the statistical differences.

12. The method of claim 8, generating a remote request to update the statistical differences.

13. The method of claim 12, further comprising generating the request via a script file.

14. A computer system having memories and one or more processors configured to execute a computerized method for data comparison, the method comprising:

standardizing, by at least one processor, attributes for each product using a standard deviation that evaluates a z-score for the attributes;

determining, by the at least one processor, a statistical distance $sim_{xy}$ between a product x and each product y of a set of products, each product having a plurality of attributes, wherein the statistical distance is determined by the following equations:

$$sim_{q(xy)} = 1 - \frac{d_{xy}}{\max|d|}$$

where $sim_{q(xy)}$ is a quantitative score for quantitative attributes of the products x and y, $d_{xy}$ is a distance measurement for the quantitative attributes of the products x and y, and max $|d|$ is a distance between two concept products: one having the largest values for each quantitative attribute of the set of products, and the other having the smallest values for each quantitative attribute of the set of products, $d_{xy}$, and max $|d|$ have the same weighting for the same attribute;

$$sim_{c(xy)} = \frac{\sum_{i=1}^{n_c} w_{ci} sum_i}{\sum_{i}^{n_c} w_{ci}}$$

where $sim_{c(xy)}$ is a categorical score for categorical attributes of the products x and y, $sum_i$ equals 1 if there is a match on the $i^{th}$ categorical attribute of products x and y or 0 or there is not a match on the $i^{th}$ categorical attribute of products x and y, $w_{ci}$ is the weighting of the $i^{th}$ categorical attribute $n_c$ is the number of categorical attributes and i is an integer;

$$sim_{xy} = \frac{\left(sim_{c(xy)} \times \sum_{i=1}^{n_c} w_{ci}\right) + \left(sim_{q(xy)} \times \sum_{i=1}^{n_q} w_{qj}\right)}{\sum_{i=1}^{n_c} w_{ci} + \sum_{i=1}^{n_c} w_{qj}}$$

where $w_{qj}$ is the weighting of the $j^{th}$ quantitative attribute, $n_q$ is the number of quantitative attributes and j is an integer; and returning statistical differences of the products based in part on the statistical distance $sim_{xy}$ and differentiators that are identified by contrasting each attribute's z-score and highlighting the attributes with a greatest positive or negative difference for display.

15. The computer system of claim 14, further comprising employing at least one of an attribute file, a values file, and a model file to communicate the statistical differences.

16. The computer system of claim 14, further comprising dynamically updating a display based upon a detected change in the statistical differences.

17. The computer system of claim 14, further comprising generating a product competitors page that contrasts products based upon the statistical differences.

18. The computer system of claim 14, generating a remote request to update the statistical differences.

19. The method of claim 18, further comprising generating the request via a script file.

\* \* \* \* \*

UNITED STATES PATENT AND TRADEMARK OFFICE
CERTIFICATE OF CORRECTION

PATENT NO. : 7,774,344 B2
APPLICATION NO. : 11/322026
DATED : August 10, 2010
INVENTOR(S) : Michael J. Horstmanshof et al.

Page 1 of 6

It is certified that error appears in the above-identified patent and that said Letters Patent is hereby corrected as shown below:

On Sheet 1 of 12, in FIG. 1, (above reference numeral 140), Line 1, above "Reference Numeral 140" insert -- 100 --.

On Sheet 3 of 12, in FIG. 3, (above reference numeral 310), Line 1, above "Reference Numeral 310" insert -- 300 --.

On Sheet 4 of 12, in FIG. 1, (above reference numeral 430), Line 1, above "Reference Numeral 430" insert -- 400 --.

On Sheet 5 of 12, in FIG. 5, delete " 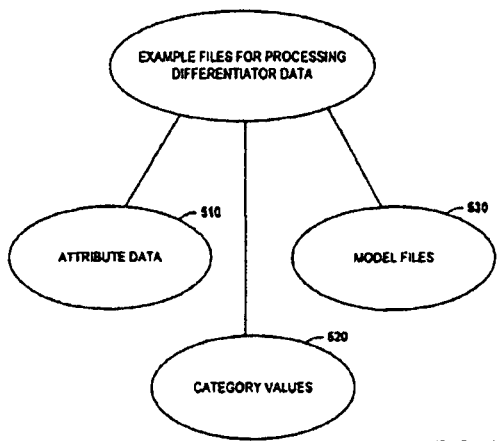 " and insert

Signed and Sealed this
Twenty-ninth Day of March, 2011

David J. Kappos
*Director of the United States Patent and Trademark Office*

CERTIFICATE OF CORRECTION (continued)
U.S. Pat. No. 7,774,344 B2

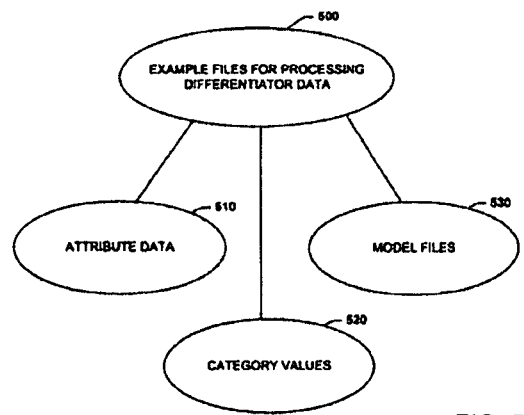

-- FIG. 5 --, therefor.

On Sheet 6 of 12, in FIG. 6, (above reference numeral 630), line 1, above "Reference Numeral 630" insert -- 600 --.

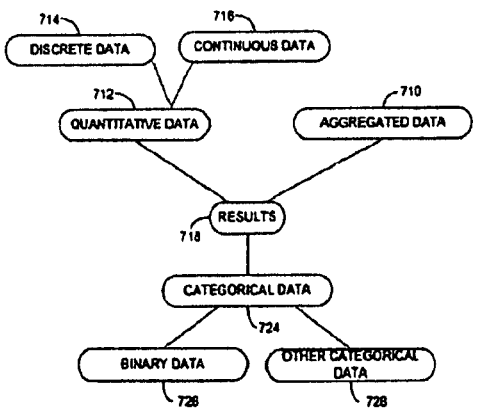

On Sheet 7 of 12, in FIG. 7, delete " FIG. 7 " and insert

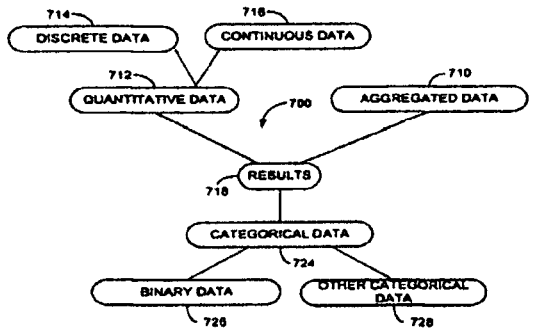

-- FIG. 7 --, therefor.

CERTIFICATE OF CORRECTION (continued)

U.S. Pat. No. 7,774,344 B2

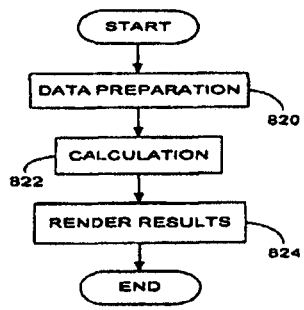

Figure 8:
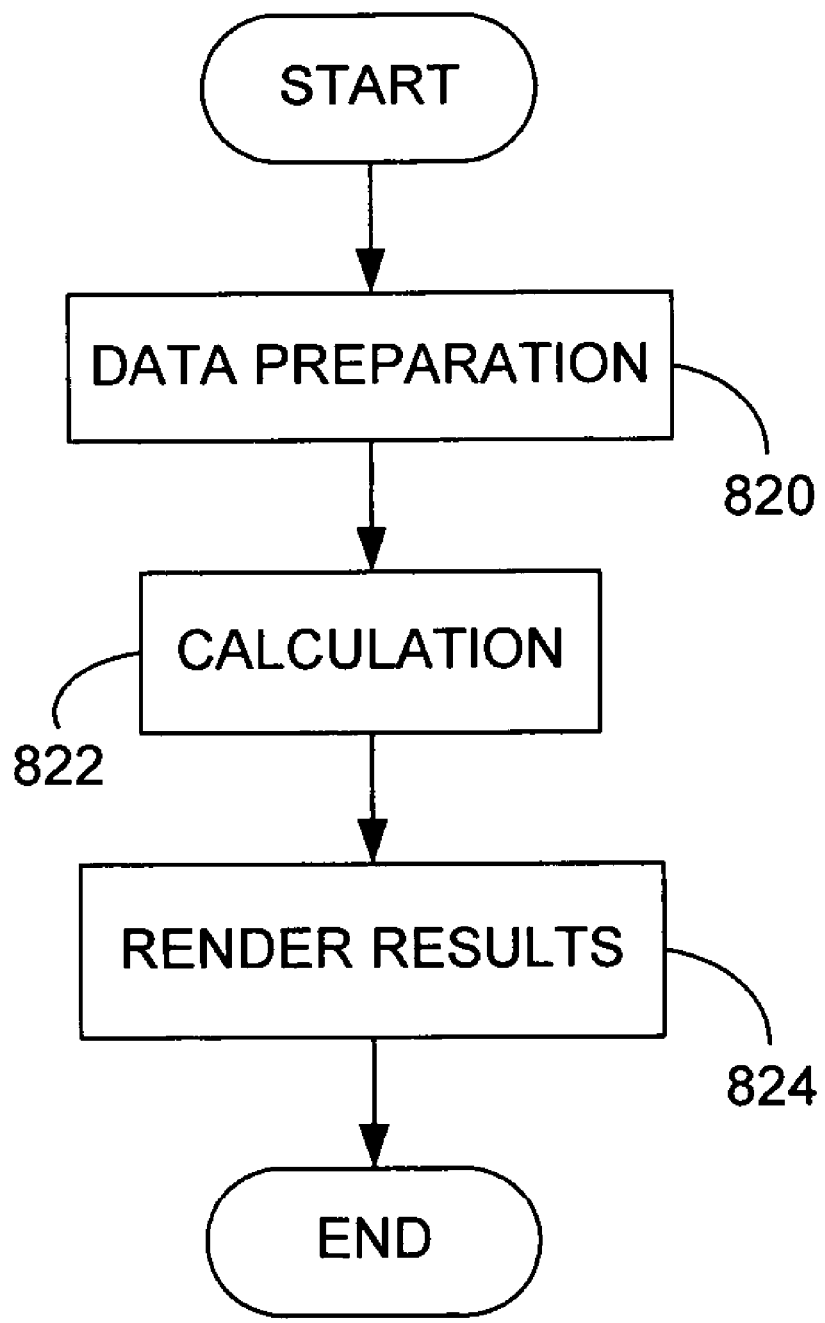
FIG. 8 illustrates a method of comparing a focal vehicle to a comparison vehicle.

On Sheet 8 of 12, in FIG. 8, delete "  FIG. 8  " and insert

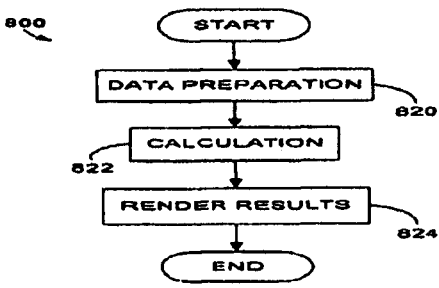

--  FIG. 8  --, therefor.

On Sheet 2 of 12, in FIG. 2, delete

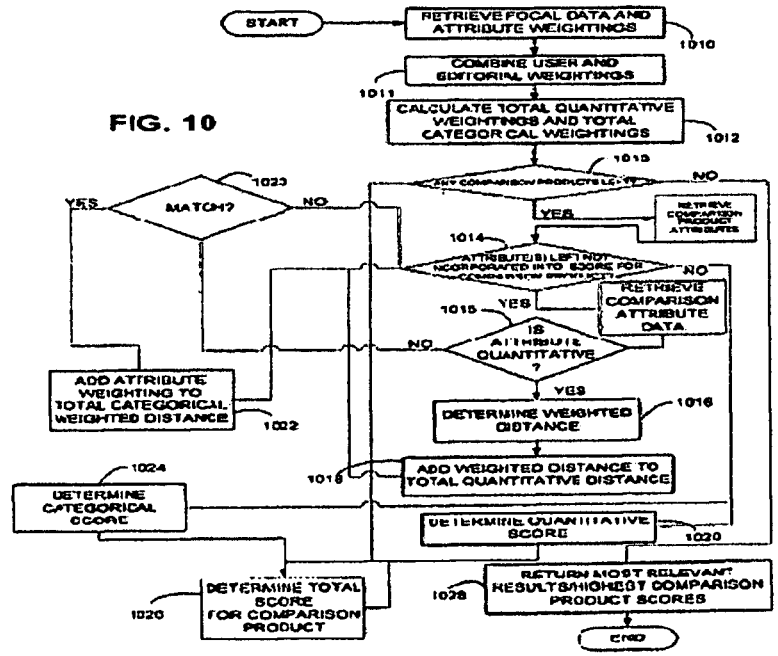

"  " and insert -- 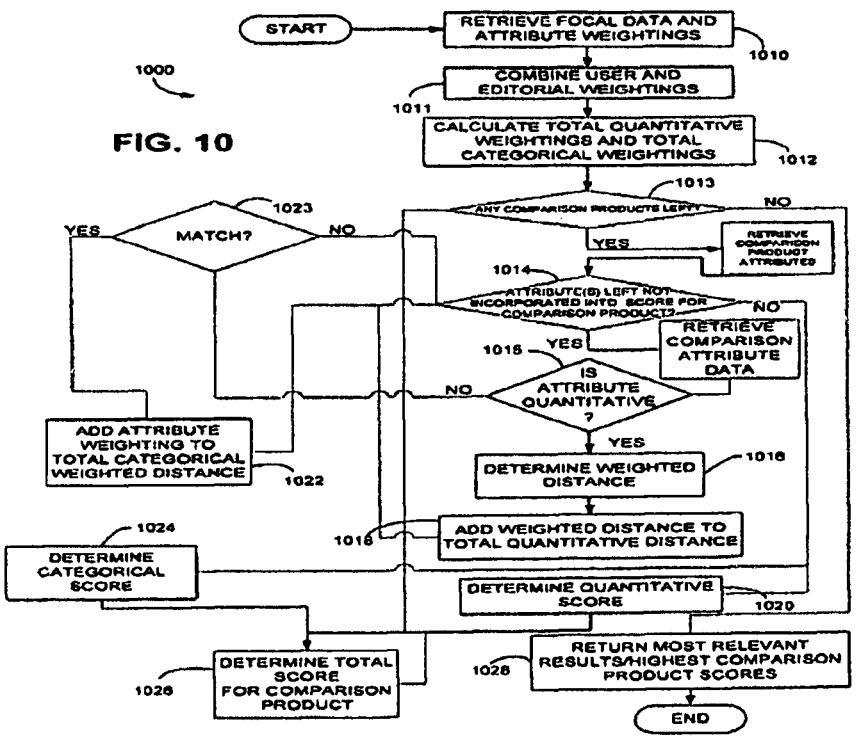 --, therefor.
On Sheet 2 of 12, in FIG. 2, delete " 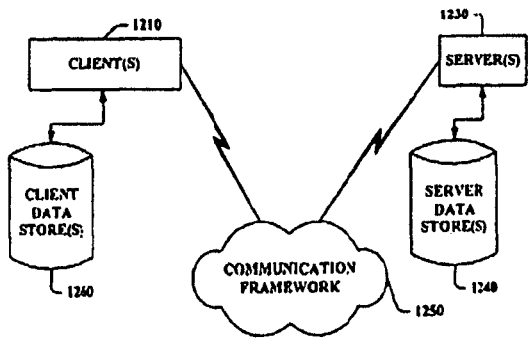 " and

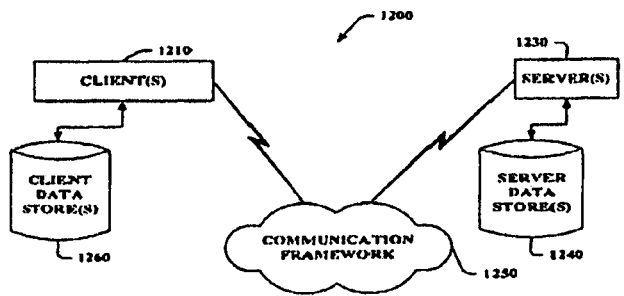

insert -- FIG. 12 --, therefor.

In column 4, line 50, before "210" insert -- At --.

In column 14, lines 51-60, in Claim 1, delete "$sim_{xy} = \dfrac{\left(sim_{c(xy)} \times \sum_{i=1}^{n_c} w_{ci}\right) + \left(sim_{q(xy)} \times \sum_{i=1}^{n_q} w_{qj}\right)}{\sum_{i=1}^{n_c} w_{ci} + \sum_{i=1}^{n_c} w_{qj}}$, $sim_{q(xy)} = 1 - \dfrac{d_{xy}}{\max|d|}, sim_{c(xy)} = \dfrac{\sum_{i=1}^{n_c} w_{ci} sum_i}{\sum_{i}^{n_c} w_{ci}}$ ," and insert -- $\dfrac{sim_{xy} = \dfrac{(sim_{c(xy)} \times \sum_{i=1}^{n_c} w_{ci}) + (sim_{q(xy)} \times \sum_{i=1}^{n_q} w_{qj})}{\sum_{i=1}^{n_c} w_{ci} + \sum_{i=1}^{n_q} w_{qj}}}{sim_{q(xy)} = 1 - \dfrac{d_{xy}}{\max|d|}, sim_{c(xy)} = \dfrac{\sum_{i=1}^{n_c} w_{ci} sum_i}{\sum_{i}^{n_c} w_{ci}}}$, --, therefor.

In column 15, line 16, in Claim 1, delete "i" and insert -- j --, therefor.

CERTIFICATE OF CORRECTION (continued)
U.S. Pat. No. 7,774,344 B2

In column 16, lines 19-21, in Claim 8, delete "$$sim_{xy} = \frac{\left(sim_{c(xy)} \times \sum_{i=1}^{n_c} w_{ci}\right) + \left(sim_{q(xy)} \times \sum_{i=1}^{n_q} w_{qj}\right)}{\sum_{i=1}^{n_c} w_{ci} + \sum_{i=1}^{n_q} w_{qj}}$$" and insert --$$sim_{xy} = \frac{(sim_{c(xy)} \times \sum_{i=1}^{n_c} w_{ci}) + (sim_{q(xy)} \times \sum_{i=1}^{n_q} w_{qj})}{\sum_{i=1}^{n_c} w_{ci} + \sum_{i=1}^{n_q} w_{qj}}$$--, therefor.

In column 17, lines 21-25, in Claim 14, delete "$$sim_{xy} = \frac{\left(sim_{c(xy)} \times \sum_{i=1}^{n_c} w_{ci}\right) + \left(sim_{q(xy)} \times \sum_{i=1}^{n_q} w_{qj}\right)}{\sum_{i=1}^{n_c} w_{ci} + \sum_{i=1}^{n_q} w_{qj}}$$" and insert --$$sim_{xy} = \frac{(sim_{c(xy)} \times \sum_{i=1}^{n_c} w_{ci}) + (sim_{q(xy)} \times \sum_{i=1}^{n_q} w_{qj})}{\sum_{i=1}^{n_c} w_{ci} + \sum_{i=1}^{n_q} w_{qj}}$$--, therefor.